United States Patent

DiFilippo

[11] Patent Number: 6,130,430
[45] Date of Patent: Oct. 10, 2000

[54] SEPTAL ARTIFACT CANCELLATION IN POSITRON EMISSION TOMOGRAPHY

[75] Inventor: Frank P. DiFilippo, University Heights, Ohio

[73] Assignee: Picker International, Inc., Highland Heights, Ohio

[21] Appl. No.: 09/027,044

[22] Filed: Feb. 20, 1998

Related U.S. Application Data

[60] Provisional application No. 60/038,248, Feb. 21, 1997.

[51] Int. Cl.[7] .................................................. G01T 1/166
[52] U.S. Cl. .................................. 250/363.03; 250/363.1
[58] Field of Search ............................. 250/363.03, 363.1

[56] References Cited

U.S. PATENT DOCUMENTS

| | | |
|---|---|---|
| 4,563,583 | 1/1986 | Hattori ................................. 250/363.1 |
| 5,210,420 | 5/1993 | Hartz et al. . |
| 5,291,021 | 3/1994 | Tanaka et al. . |
| 5,448,073 | 9/1995 | Jeanguillaume ................... 250/363.02 |
| 5,451,789 | 9/1995 | Wong et al. . |
| 5,512,754 | 4/1996 | Enos . |
| 5,602,395 | 2/1997 | Nellemann et al. . |

*Primary Examiner*—Constantine Hannaher
*Attorney, Agent, or Firm*—T. B. Gurin; J. J. Fry

[57] ABSTRACT

A camera for use in coincidence imaging includes detector heads (10a, 10b) disposed about an examination region (12). The detector heads (10a, 10b) include septa (36) for absorbing radiation having a relatively large axial angle. The septa, however, cause the sensitivity of the detectors (10a, 10b) to vary as a function of axial position along their face. The relative positions of the detectors (10a, 10b) and the patient are varied so as to reduce septal artifacts. In particular, artifacts arising from second and fourth harmonics may be reduced.

37 Claims, 6 Drawing Sheets

COUNT PROFILE OF LINE SOURCE

POWER SPECTRUM PLOT

COUNT PROFILE OF LINE SOURCE

POWER SPECTRUM PLOT

COUNT PROFILE OF LINE SOURCE

POWER SPECTRUM PLOT

SEPTAL ARTIFACT CANCELLATION IN POSITRON EMISSION TOMOGRAPHY

The present application claims priority to U.S. Provisional Application Ser. No. 60/038,248 filed Feb. 21, 1997. The present invention relates to the field of nuclear medicine, and specifically to the field of positron emission tomography (PET).

BACKGROUND

Positron emission tomography (PET) is a branch of nuclear medicine in which a positron-emitting radiopharmaceutical such as $^{18}$F-fluorodeoxyglucose (FDG) is introduced into the body of a patient. Each emitted positron reacts with an electron in what is known as an annihilation event, thereby generating a pair of 511 keV gamma rays which are detected and used to create a clinically useful image.

Traditionally, PET scanners have used detector elements arranged in circles or rings about the imaging region, with the plane of the rings perpendicular to the axis of the imaging region. Each ring corresponds to an axial slice of the product. As described in U.S. Pat. No. 5,210,420 to Hartz, axial septa made from a radiation attenuating material such as lead have been placed so that gamma radiation traveling at relatively large angles is absorbed by the septa prior to reaching the collimator. Data from each ring of a plurality of slices is reconstructed using a two dimensional reconstruction algorithm.

One disadvantage associated with traditional PET scanners is their cost and complexity. Because the detectors and associated septa define distinct axial rings, sampling in the axial direction is discontinuous. As a result, reconstruction is limited to a fixed slice thickness. A further disadvantage is that the septa produce a shadow-like sensitivity variation in the axial direction. This variation in sensitivity is not apparent in ring-type PET scanners because the axial sampling interval is equivalent to the septal spacing. In systems having increased axial resolution, this variation can lead to undesirable image artifacts.

The present invention addresses these shortcomings, and others. One advantage of the present invention is that gamma radiation having a relatively large axial angle can be absorbed prior to reaching the detector. Yet another advantage is that increased axial resolution may be obtained as compared to traditional systems. Similarly, image reconstruction into slices having various positions and widths is facilitated. Yet another advantage is that image artifacts introduced by axial septa can readily be reduced. More specifically, axial sensitivity variations can be reduced by selectively canceling artifact components having different frequencies. Still other advantages will be recognized by those skilled in the art upon reading and understanding the appended description.

SUMMARY

According to a first aspect of the present invention, an apparatus for use in positron imaging includes a first detector having a radiation sensitive face which faces an examination region and a second detector having a radiation sensitive face which faces the examination. The second detector includes a plurality of septa disposed between the radiation sensitive face and the examination region. Each of the septa includes a major axis, and the septa have a septal period a in a direction perpendicular to their major axes, together with a corresponding septal frequency 1/a. The apparatus also includes means for translating the septa a plurality n of discrete positions with respect to the examination region, each of the positions being separated by a distance equal to a/2n. The apparatus also includes means operatively connected to the first and second detectors for collecting data indicative of positron annihilation events occurring with the examination region with the septa positioned at each of the plurality of positions.

According to a more limited aspect, the major axes of the septa extend in a transverse direction and the septa are translated to a plurality n of discrete axial positions. According to still more limited aspects, n may be equal to 2 or 4.

According to still more limited aspects, data is collected with the septa positioned at each of the plurality of axial positions for an equal period of time, whereby septal artifacts at the nth harmonic of the septal frequency are substantially canceled. The means for positioning may include means for moving the second detector in an axial direction.

According to another more limited aspect, the apparatus includes means for rotating the detectors about the examination region to a plurality of angular positions, the rotation of the detectors and the translation of the septa being coordinated such that, at each angular positions, septal artifacts at the second harmonic of the septal frequency are substantially canceled. The rotation of the detectors and the translation of the septa may be coordinated such that septal artifacts at the fourth harmonic of the septal frequency are canceled in data acquired over two angular positions.

According to still another more limited aspect, the rotation of the detectors and the translation of the septa are coordinated such that septal artifacts at the second harmonic of the septal frequency are canceled in data collected over two angular positions.

According to another more limited aspect, the rotation of the detectors and the translation of the detectors may be coordinated such that septal artifacts at the nth harmonic of the septal frequency are canceled in data collected over m angular positions. For example, m may be equal to 4.

According to still another limited aspect, rotation of the detectors and translation of the septa may be coordinated such that, at each angular position, the septa are positioned at a plurality of discrete positions, each of the positions being separated by a distance equal to ma/2n.

According to another aspect of the invention, an imaging apparatus includes a first detector having a radiation sensitive face which faces an examination region and a second detector having a radiation sensitive face which faces the examination region. The second detector includes a plurality of septa disposed between the radiation sensitive face and the examination region. Each of the septa includes a major axis extending in a transverse direction. The septa have a first septal period. The apparatus also includes means for rotating the detectors to a plurality of angular positions with respect to the examination region, means for translating the plurality of septa in an axial direction from a first position to a second position which is displaced from the first by a distance equal to one-half the septal period, said translation occurring at each of the plurality of angular positions, means operatively connected to the detectors for collecting data indicative of positron annihilation events occurring within the examination region during translation of the septa, and means for generating an image indicative of the positron annihilation events.

Still other aspects and advantages of the present invention will be understood by those skilled in the art upon reading and understanding the appended description.

FIGURES

DESCRIPTION

Figure 1:
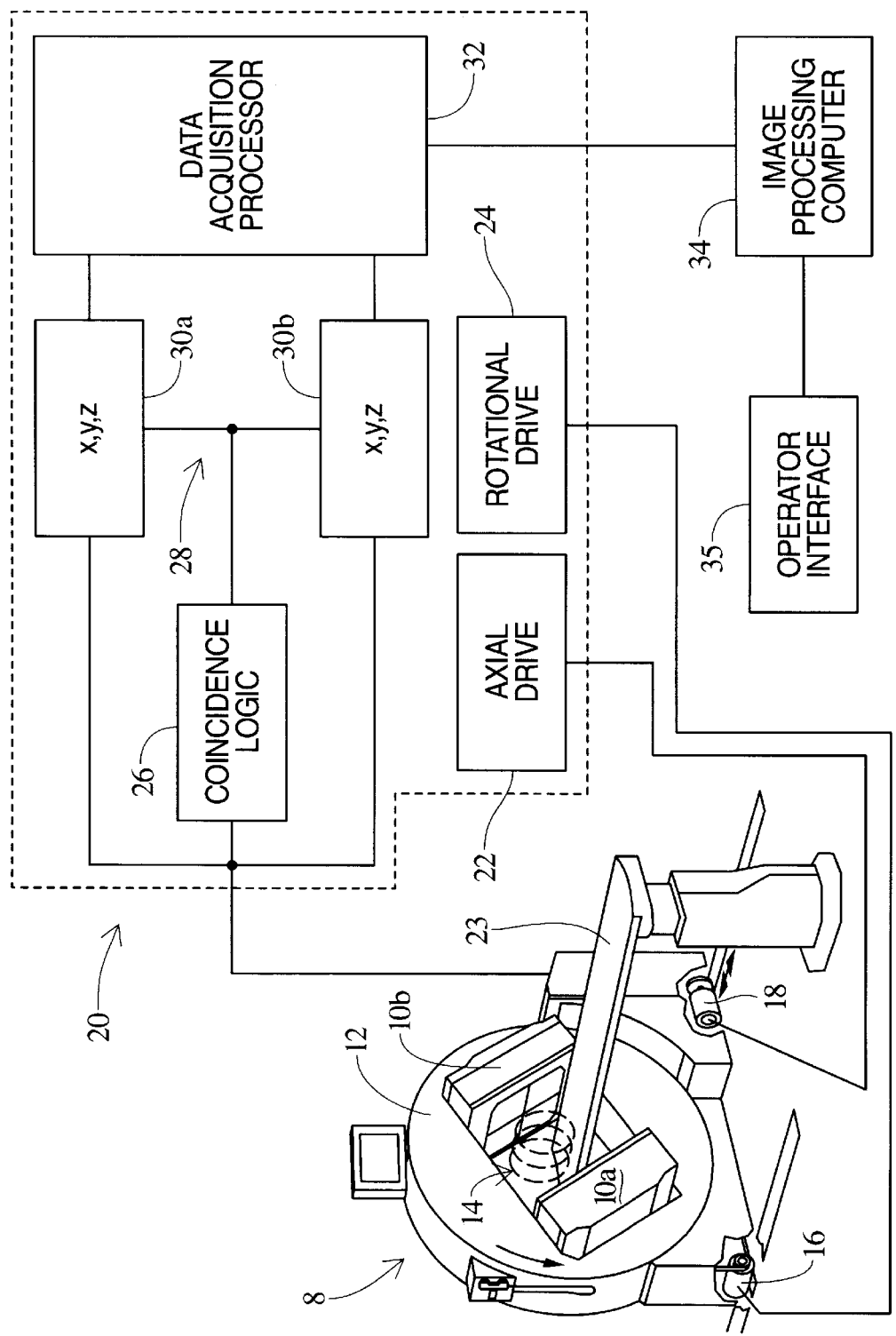
FIG. 1 is a block diagram of a gamma camera according to the present invention.

With reference to FIG. 1, a gamma camera 8 includes gamma camera heads 10a, 10b mounted to move rotationally and axially with respect to an examination region 14. Radiation emanating from or passing through the subject is detected by the gamma camera heads 10a, 10b. Although described with respect to two gamma camera heads 10a, 10b, three or more heads can also be used.

The heads 10a, 10b are mounted to a rotating gantry portion 12. The gamma camera 8 also includes a rotational motive means such as motor 16 and an axial motive means such as motor 18 which can be operated alone or in combination in order to move the detector heads 10a, 10b to a plurality of positions with respect to the examination region 14. The rail mounted gantry and hence the detectors 10a, 10b can be translated axially along the examination region 14 and rotated about the examination region 14 in a generally circular path.

A gantry processor 20 includes an axial drive 22 and rotational drive 24 for controlling the operation of the motors 16, 18. Associated with each drive is a position feedback device such as a position encoder. Accordingly, drives 22 and 24 provide closed-loop control of the rotational and axial positions. Relative axial motion between the detectors 10a, 10b and the patient can alternately be accomplished by translating the patient support 23.

Each detector head 10 includes a NaI(Tl) scintillator crystal layer and x,y array of photomultiplier tubes (PMTs). Energy from gamma rays striking the scintillator crystal is converted to light which is detected by one or more of the PMTs, thereby signaling a detected event. Coincidence logic circuitry 26 determines whether events are detected by both detectors 10a, 10b simultaneously. More specifically, the coincidence logic 26 determines whether both detectors detect a gamma ray within a predetermined coincidence time interval, for example on the order of 15 nanoseconds. If so, the coincidence logic 26 generates a digital coincidence signal 28 which indicates that a coincidence event has occurred. If, on the other hand, the detectors 10a, 10b detect events which are separated in time by more than the coincidence time interval, the coincidence signal 28 is not generated, and the events are not processed further.

The gantry processor 20 also includes means for processing the output data from the detector heads 10a, 10b. Associated with each detector 10a, 10b is energy and position determining circuitry 30a, 30b which determines both the energy z and position x,y of the detected events. The circuitry 30a, 30b is triggered by the coincidence signal 28 such that the energy z and position x,y is determined only for coincident events. For each coincidence event, positions and energies $x_1, y_1, z_1$ and $x_2, y_2, z_2$ are generated corresponding to the events detected by the detectors 10a, 10b. The positions $y_1, y_2$ in the axial direction are adjusted to account for the axial position of the detector heads at the time the coincident event is detected. Stated another way, the y positions are determined with respect to the patient or imaging regions.

A data acquisition processor 32 receives the data for each detected event and generates a list which includes the energy z and position x,y of the detected events in each of a plurality of coincidence event pairs, together with the rotational position θ of the detector at the time the coincidence event is detected. This information is preferably stored for processing at a convenient time, for example after data acquisition for a particular patient has been completed.

Further processing of the stored data is preferably accomplished using a conventional imaging computer 34. The list mode data is sorted or "rebinned" based on the $x_1, y_1$ and $x_2, y_2$ of the detected events according to the well-known single-slice rebinning method. The data is reconstructed using conventional reconstruction techniques such as filtered backprojection or iterative reconstruction to generate images indicative of the object being imaged. An operator interface 35 preferably includes a video processor and monitor for converting selected portions of the images into human readable form.

Figure 2:
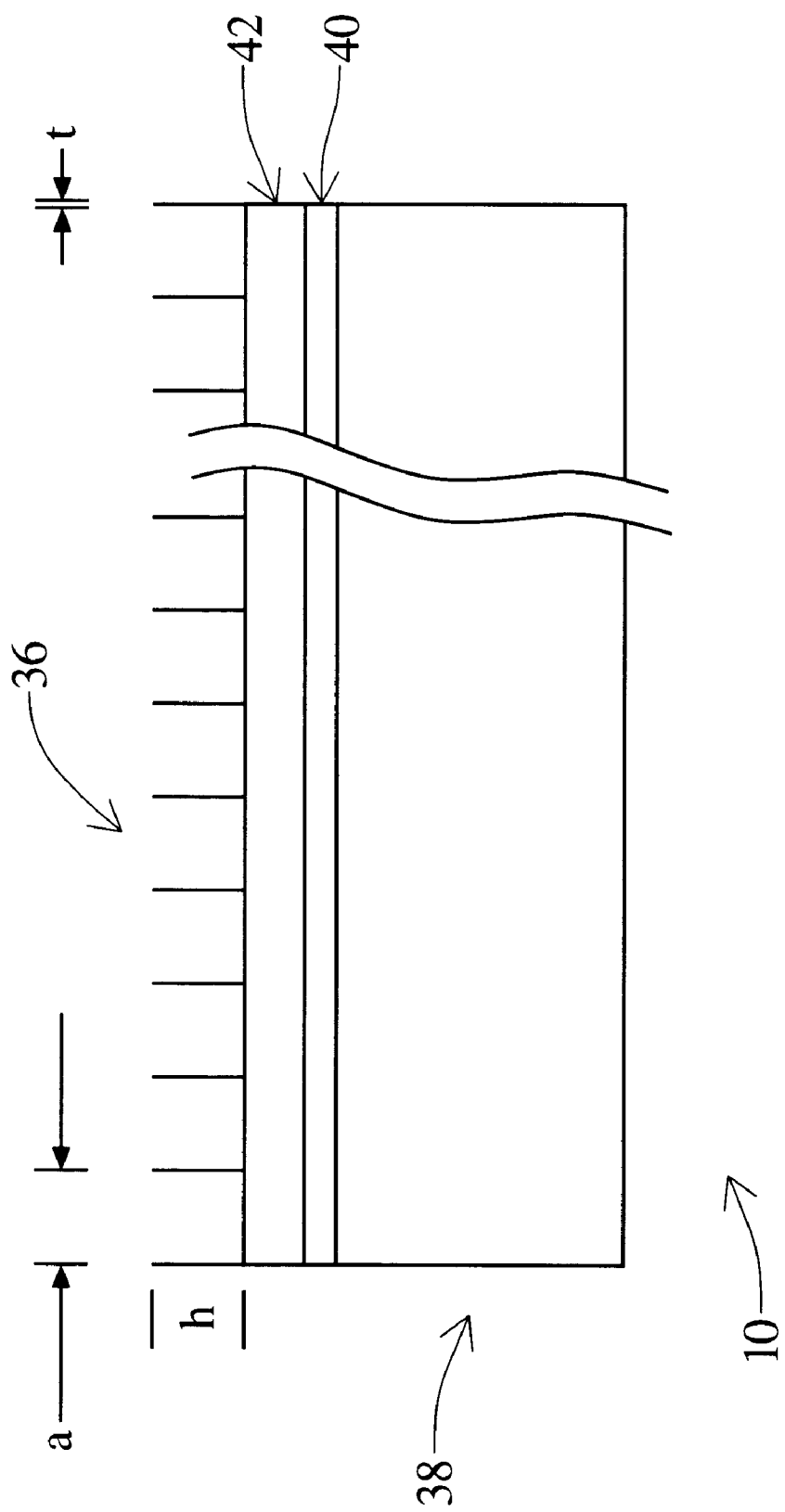
FIG. 2 is a side view of a detector head.

With reference to FIG. 2, each detector head 10a, 10b preferably comprises a plurality of PMT's 38 arranged in an x,y matrix, a light transmissive supportive layer 40 made from a material such as glass, and a scintillator crystal layer 42 comprising sodium iodide doped with thallium (NaI(Tl)).

A plurality of generally rectangular lead septa 36 are disposed adjacent the scintillator layer 42 with their long axes oriented in the transverse direction, in other words perpendicular to the axial or y direction. In the preferred embodiment, the septa 36 have a height h=2.3 inch (5.84 cm), a thickness t=0.1875 inch (4.76 mm), and a center-to-center axial spacing or period a=0.6875 inch (17.46 mm). It will be appreciated that other dimensions can readily be implemented.

The septa 36 may alternately be constructed from a material other than lead which provides a desired degree of radiation attenuation. As described in U.S. Pat. No. 5,309,911 to Grenier, issued May 10, 1994, which is expressly incorporated by reference herein, the septa 36 may also be covered with a layer of a material such as tin or copper which absorbs characteristic x-rays generated in the lead septa 36. Other septa configurations may also be implemented. For example, the height h may be varied as a function of axial or transverse position on the detector 10. The long axes of the septa may also be disposed at an angle with respect to the longitudinal axis. Of course, other heights, thicknesses, and axial spacings may be used. The septa 36 may also be spaced away from the scintillator layer 42.

The axial septa 36, while effective in removing undesirable incident gamma radiation having a relatively large axial angle, also remove a portion of desirable incident gamma radiation having a relatively small axial angle. As a result, the septa 36 cause a shadow-like sensitivity variation in the axial direction. Locations at the midpoints between the septa 36 have the highest solid angle of acceptance. Locations directly below the septa 36 have a solid angle of acceptance nearly equal to those at the midline. Locations which are one quarter and three quarters of the distance between the septa 36 have the lowest solid angle of acceptance. More generally, the septa cause a generally sinusoidal sensitivity variation having spatial frequency components:

$$f_n = n \times \frac{1}{a} \qquad (1)$$

where a is the axial septa spacing and n=even harmonics 2, 4, 6 . . . .

Figure 3A:
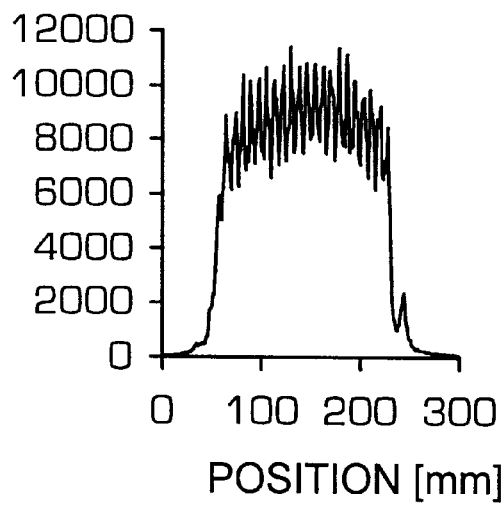
FIGS. 3A and 3B show the count profile and power spectrum plot, respectively, for a line source in which septal harmonics have not been canceled.
Figure 3B:
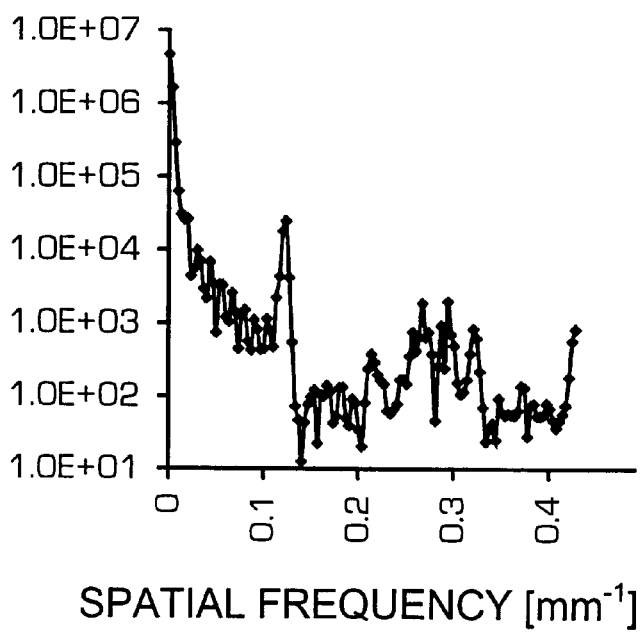

This effect can be understood with reference to the count profile and power spectrum plot shown in FIGS. 3A and 3B, respectively. An $^{18}F$ line source was placed in the imaging region of a gamma camera 8 having septa with an axial spacing or period of a=16 mm. The line source was oriented to be perpendicular to the septa 36, and there was no relative axial motion between the detectors 10a, 10b and the line source. Data was acquired, and detected event pairs were rebinned into sinograms using single slice rebinning as is typically done in PET scanners. With reference to FIGS. 3A and 3B, a periodic variation in the count profile having a spatial frequency f=0.12 mm$^{-1}$ (the second harmonic of the septal frequency 1/a) is readily observed, together with a corresponding peak in the power spectrum. With particular reference to FIG. 3B, peaks in the power spectrum at the fourth and sixth harmonics of the septal frequency (f=0.24 mm$^{-1}$ and 0.36 mm$^{-1}$), while lower in amplitude, can also be observed.

Figure 4A:
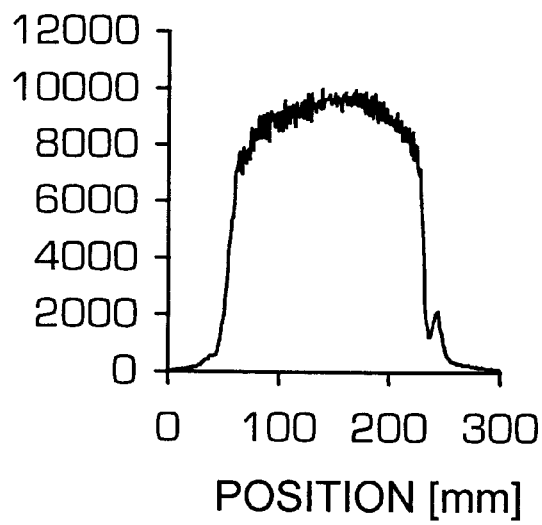
FIGS. 4A and 4B show the count profile and power spectrum plot, respectively, for a line source in which the second septal harmonic has been canceled.
Figure 4B:
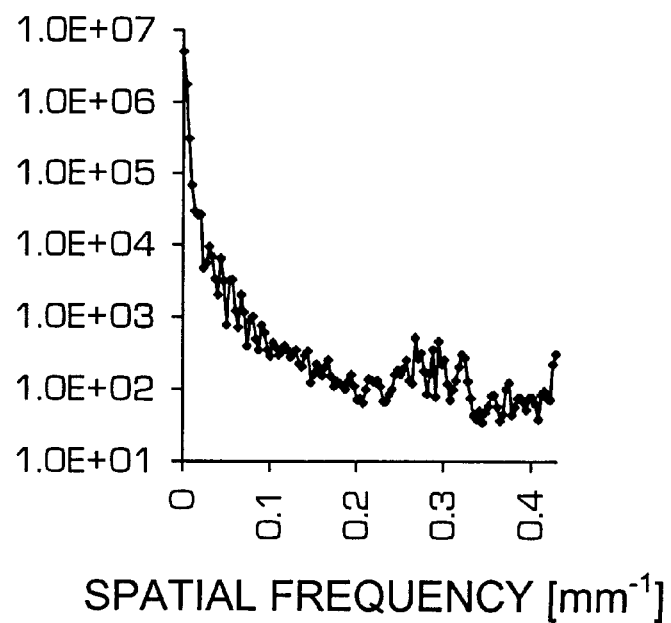

The second harmonic may be canceled by acquiring data with the radiation source and the detectors 10a, 10b and hence the septa at an initial axial position and at second axial position offset from the initial axial position by one-fourth the septal spacing or period. As shown in FIGS. 4A and 4B, the septal artifact at f=0.24 mm$^{-1}$ is thereby substantially removed, although an artifact at the fourth harmonic f=0.36 mm$^{-1}$ remains.

Figure 5A:
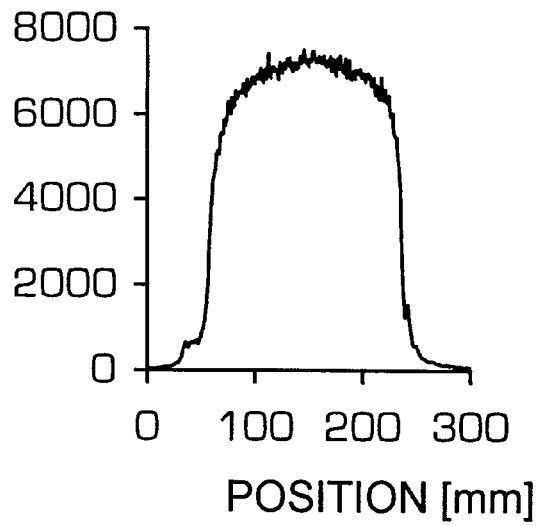
FIGS. 5A and 5B show the count profile and power spectrum plot, respectively, for a line source in which the second and fourth septal harmonics have been canceled.
Figure 5B:
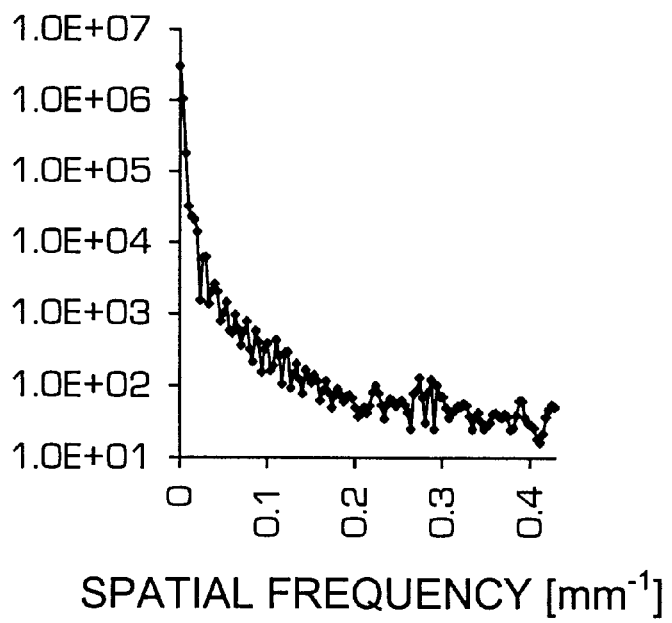

Both the second and fourth harmonic may be canceled by acquiring data with the detectors 10a, 10b and hence the septa at an initial axial position and at additional axial positions offset from the initial position by one-eighth, one-fourth, and three-eights the septal frequency. See FIGS. 5A and 5B.

More generally, even harmonics 2 through n of the septal frequency can be canceled by collecting data at each of the following axial positions:

$$0, \frac{1}{2n}, \frac{2}{2n}, \frac{3}{2n}, \ldots \frac{n-1}{2n} \qquad (2)$$

It will of course be recognized that the largest permissible value for the numerator is n-1. Where n=2, for example, the above notation will be recognized as requiring data collection at axial positions 0 and 0.25a. Preferably, data is acquired for an equal period of time at each of the positions so that the harmonic cancellation is optimized.

Although the invention has been described primarily in respect of moving the detectors 10 (and hence the septa 36) relative to the object being imaged, the advantages of the present invention may also be obtained by moving the septa 36 in the axial direction with respect to the detectors 10.

From the foregoing, it will be appreciated that optimum cancellation of septal artifacts can be accomplished by collecting data substantially continuously over an axial position range beginning at an initial position and ending at a position offset by one-half the septal frequency. Viewed from another perspective, no harmonic canceling will be achieved if data is collected only at a single axial position.

This principle may also be advantageously used where the rotating gantry 12 and hence the detectors 10a, 10b are rotated or stepped through a plurality of angular positions during data acquisition. By acquiring data at axial positions described in (2) above for each of the angular positions, the desired harmonics can be canceled at each angular position. Thus, for example, the second and fourth harmonics can be canceled in the data collected at each of the angular positions.

As noted above, the second harmonic has the largest contribution to septal artifacts, followed by the fourth harmonic. Accordingly, it is particularly desirable to ensure cancellation of the second harmonic at each of the angular positions. From Equation 2, this can be accomplished by acquiring data at axial positions separated by one-fourth the septal frequency at each angular position. Cancellation of the fourth harmonic in data acquired over two angular positions, while maintaining cancellation of the second harmonic at each angular position, can be accomplished by acquiring data at each of the following positions:

| Angular Position | Relative Axial Position |
|---|---|
| $\theta_0$ | 0 |
| $\theta_0$ | 0.25a |
| $\theta_1$ | 0.125a |
| $\theta_1$ | 0.375a |

The sequence is repeated for each of a plurality of angular positions $\theta_2$ to $\theta_n$ as the gantry 12 is rotated about the imaging region. In this way, each angular position contains data acquired at axial positions collected at intervals of one-fourth the septal period, while each pair of angular positions contains data acquired at axial intervals of one-eighth the septal period.

Similarly, the second harmonic can be canceled in data collected over two angular positions by acquiring data as follows:

| Angular Position | Relative Axial Position |
|---|---|
| $\theta_0$ | 0 |
| $\theta_1$ | 0.25a |
| $\theta_2$ | 0 |
| $\theta_3$ | 0.25a |

In this case, it will be appreciated that data collected at each angular position is influenced by the second harmonic.

More generally, one can achieve cancellation of the nth harmonic using data acquired over m angular positions by acquiring the data as follows:

| Angular Position | | Axial Positions |
|---|---|---|
| For m = 1 | $\theta_0$ | $0, \frac{1}{2n}, \frac{2}{2n}, \frac{3}{2n}, \ldots \frac{n-1}{2n}$ |
| m = 2 | $\theta_0$ | $0, \frac{m}{2n}, \frac{m+2}{2n}, \frac{m+4}{2n}, \ldots \frac{n-2}{2n}$ |

-continued

| Angular Position | Axial Positions |
|---|---|
| $\theta_1$ | $\frac{1}{2n}, \frac{m+1}{2n}, \frac{m+3}{2n}, \ldots \frac{n-1}{2n}$ |
| $m = 4 \quad \theta_0$ | $0, \frac{m}{2n}, \frac{m+4}{2n}, \frac{m+8}{2n}, \ldots \frac{n-4}{2n}$ |
| $\theta_1$ | $\frac{1}{2n}, \frac{m+1}{2n}, \frac{m+5}{2n}, \frac{m+9}{2n}, \ldots \frac{n-3}{2n}$ |
| $\theta_2$ | $\frac{2}{2n}, \frac{m+2}{2n}, \frac{m+6}{2n}, \frac{m+10}{2n}, \ldots \frac{n-2}{2n}$ |
| $\theta_3$ | $\frac{3}{2n}, \frac{m+3}{2n}, \frac{m+7}{2n}, \frac{m+11}{2n}, \ldots \frac{n-1}{2n}$ | and so on. The highest harmonic canceled in the data collected at each angular position will be harmonic n/m. It will be appreciated that as the number of angular positions m is increased, the order n of the harmonic which is canceled in each angular position is reduced. In the case where m=n, there is no harmonic cancellation within a given angular position.

In general, smaller values of m, while providing superior cancellation, require that data be collected at a greater number of positions. Similarly, larger values of n, while providing superior cancellation, also require that data be collected at a greater number of positions.

As will be appreciated, the invention facilitates the collection of position coincidence data in such a way that undesirable septal harmonics can be selectively canceled with a minimum of motion. The invention can also be used in connection with rotating gantry detectors to provide cancellation of selected septal harmonics at each angular position. Similarly, higher order harmonics may be effectively canceled based on data collected at several relative axial positions.

Septal cancellation is effective for values of m greater than one because image projections are acquired over a range of angular positions. For example, a line of coincidence at a transverse angle of θ degrees may be acquired at gantry angles between +/−45 degrees. Therefor sufficient cancellation can be achieves by interspersing the axial steps between multiple angular positions.

It should also be noted that sensitivity variations having a frequency component at the first harmonic of the septal frequency (i.e. where n=1) may be canceled by acquiring data at axial positions of 0 and 0.5a.

Figure 6:
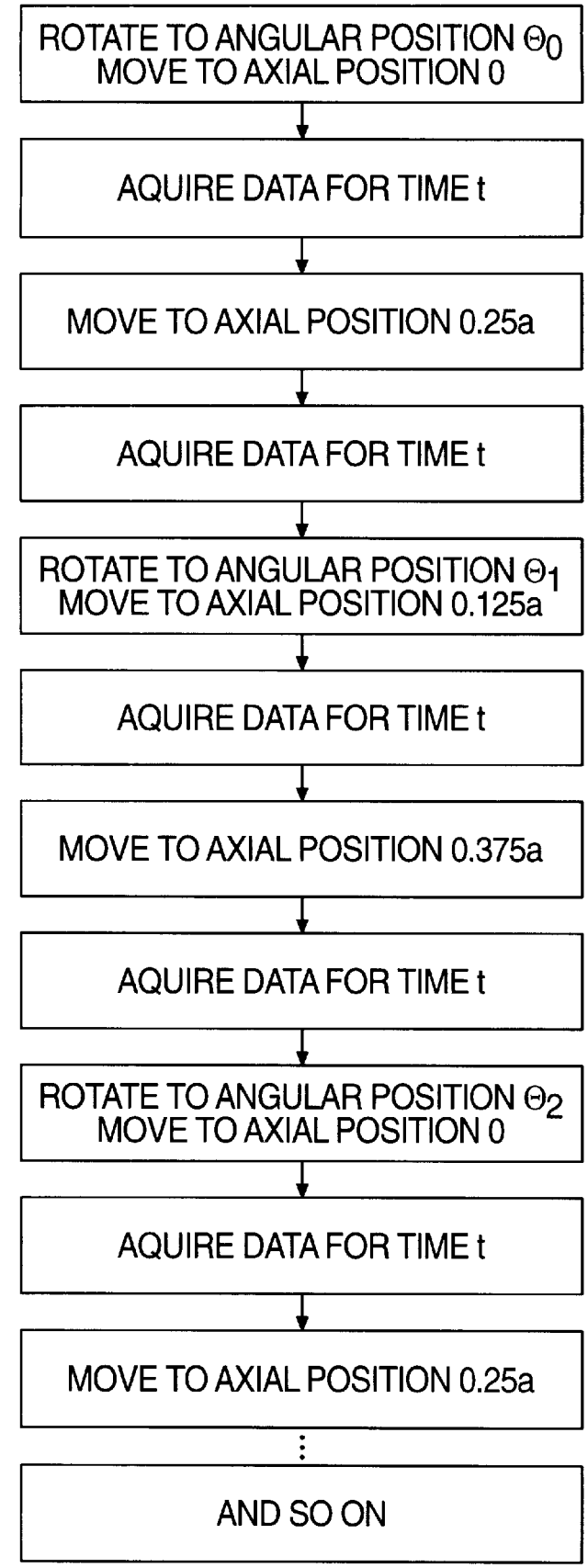
FIG. 6 is a block diagram describing detector motion and data acquisition according to the present invention.

In operation, a radiopharmaceutical such as FDG is introduced into the body of a patient, and the patient is placed in the examination region 14. In the preferred embodiment, the gantry is moved and data is collected as shown in FIG. 6 until the gantry 12 is rotated over a desired range, for example 180° in 3 degree steps. It will be appreciated that, according to the notation used above, m=2 and n=4. The collected data is then used to reconstruct an image indicative of the patient. Of course, the order in which the various angular and axial positions is reached can readily be varied.

The invention has been described in relation to its preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. An apparatus for use in positron emission comprising:

a first detector having a radiation sensitive face which faces an examination region;

a second detector having a radiation sensitive face which faces the examination region, the second detector including a plurality of septa disposed between the radiation sensitive face and the examination region, each of the septa including a major axis, the septa having a septal period a in a direction perpendicular to their major axes and a corresponding septal 1/a;

means for translating the septa to a plurality n of discrete positions with respect to the examination region, each of the positions being separated by a distance equal to $$\frac{1}{2n} \times a; \text{ and}$$

means operatively connected to the first and second detectors for collecting data indicative of positron annihilation events occurring within the examination region with the septa positioned at each of the plurality of positions.

2. The apparatus of claim 1 wherein the major axes extend in a transverse direction and the septa are translated to a plurality n of discrete axial positions.

3. The apparatus of claim 2 wherein n=2.

4. The apparatus of claim 2 wherein n=4.

5. The apparatus of claim 2 wherein data is collected with the septa positioned at each of the plurality of axial positions for an equal period of time, whereby septal artifacts at the $n^{th}$ harmonic of the septal frequency are substantially canceled.

6. The apparatus of claim 2 wherein the means for translating includes means for moving the second detector in an axial direction.

7. The apparatus of claim 1 further including:

means for rotating the detectors about the examination region to a plurality of angular positions, the rotation of the detectors and the translation of the septa being coordinated such that, at each angular position, septal artifacts at the second harmonic of the septal frequency are substantially canceled.

8. The apparatus of claim 7 wherein the rotation of the detectors and the translation of the septa are coordinated such that septal artifacts at the fourth harmonic of the septal frequency are canceled in data acquired over two angular positions.

9. The apparatus of claim 1 further including:

means for rotating the detectors about the examination region to a plurality of angular positions, the rotation of the detectors and the translation of the septa being coordinated such that septal artifacts at the second harmonic of the septal frequency are canceled in data collected over two angular positions.

10. The apparatus of claim 1 further including:

means for rotating the detectors about the examination region to a plurality of angular positions, the rotation of the detectors and the translation of the septa being coordinated such that septal artifacts at the $n^{th}$ harmonic of the septal frequency are canceled in data collected over m angular positions.

11. The apparatus of claim 10 wherein m=4.

12. The apparatus of claim 1 further including:

means for rotating the detectors about the examination region to a plurality m of angular positions, the rotation of the detectors and the translation of the septa being coordinated such that, at each angular position, the septa are positioned at a plurality of discrete positions, each of the positions being separated by a distance equal to $$\frac{m}{2n} \times a.$$

13. The apparatus of claim 12 wherein the major axes extend in a transverse direction and the septa are translated to a plurality of discrete axial positions.

14. An imaging apparatus comprising:
a first detector having a radiation sensitive face which faces an examination region;
a second detector having a radiation sensitive face which faces the examination region, the second detector includes a plurality of septa disposed between the radiation sensitive face and the examination region, each of the septa including a major axis extending in a transverse direction, the septa having a first septal period;
means for rotating the detectors to a plurality of angular positions with respect to the examination region;
means for translating the plurality of septa in an axial direction from a first position to a second position which is displaced from the first by a distance equal to one-half the septal period, said translation occurring at each of the plurality of angular positions;
means operatively connected to the detectors for collecting data indicative of positron annihilation events occurring within the examination region during translation of the septa; and
means for generating an image indicative of positron annihilation events.

15. The apparatus of claim 14 wherein the septa comprise lead.

16. The apparatus of claim 14 wherein the first detector includes a plurality of septa disposed between the radiation sensitive face and the examination region, each of the septa including a major axis extending in a transverse direction, the septa having a second septal period.

17. The apparatus of claim 16 wherein the first septal period is equal to the second septal period.

18. The apparatus of claim 14 wherein the septa have a uniform height.

19. The apparatus of claim 14 wherein the septa are spaced away from the radiation sensitive face.

20. The apparatus of claim 14 further including three or more detectors.

21. An apparatus for use in positron imaging comprising:
first and second detectors, each detector including
a radiation sensitive face which faces an examination region; and
a plurality of septa, each of the septa having a major axis, the septa having an septal period a and a corresponding septal frequency 1/a;
means for positioning the septa at first and second discrete axial positions, the second axial position being offset from the first by distance equal to one-fourth the septal period;
a coincidence timing circuit operatively connected to the first and second detectors.

22. The positron emission tomography apparatus of claim 21 further including means for positioning the septa at first, second, third, and fourth discrete axial positions, the axial positions being offset by a distance equal to one-eight the septal period.

23. The positron emission tomography apparatus of claim 21 further including:
a gantry, the first and second detectors being mounted to the gantry for rotation about an axis of rotation;
means for coordinating the rotation of the detectors and the positioning of the septa such that, at each angular position, the septa are positioned at a plurality of discrete axial positions, each of the positions being separated by a distance equal to $$\frac{m}{2n}$$

such that septal artifacts at the $n^{th}$ harmonic of the septal frequency are canceled in data collected over m angular positions.

24. The apparatus of claim 21 wherein the means for positioning includes an axial drive.

25. The apparatus of claim 21 wherein the detectors include an x,y array of photosensitive elements disposed behind a layer of scintillator material.

26. A method of utilizing a positron emission tomography apparatus which includes a first detector having a radiation sensitive face which faces an examination region, a second detector having a radiation sensitive face which faces an examination region, the second detector having a plurality of septa disposed between the radiation sensitive face and the examination region, each of the septa having a major axis, the septa having a septal period a, the method comprising the steps of:
positioning the septa at a first position;
detecting gamma radiation indicative of a plurality of positron annihilation events for a first time interval;
moving the septa in an axial direction to a position offset from the first by a distance equal to one-fourth the septal period; and
detecting gamma radiation indicative of a plurality of positron annihilation events for a second time interval selected so that septal artifacts having a frequency equal to $(2a)^{-1}$ are substantially canceled.

27. The method of claim 26 further comprising:
moving the septa in an axial direction to a position offset from the first by a distance equal to one-eighth the septal period;
detecting gamma radiation indicative of a plurality of positron annihilation events for a third time interval;
moving the septa in an axial direction to a position offset from the first by a distance equal to three-eighths the septal period; and
detecting gamma radiation indicative of a plurality of positron annihilation events for a fourth time interval.

28. The method of claim 27 further comprising:
after the step of detecting gamma radiation for the fourth time interval, rotating the detectors about the examination region to a second angular position.

29. The method of claim 28 wherein the first, second, third, and fourth time intervals are equal and further comprising the step of utilizing the detected radiation to generate an image indicative of the positron annihilation events.

30. The method of claim 26 wherein the step of moving the septa comprises moving the septa with respect to the radiation sensitive faces of the detectors.

31. The method of claim 26 wherein the steps of moving the septa comprise moving the detectors in an axial direction.

32. A method of imaging comprising:

positioning first and second detectors about an examination region, each detector having a radiation sensitive face which faces the examination region, the second detector including a plurality of septa disposed between its radiation sensitive face and the examination region, each of the septa having a major axis which extends in a transverse direction, the septa having a first septal period;

placing the septa in a first axial position;

moving the septa in an axial direction by a distance equal to one-half the septal period;

during the step of moving, utilizing the detectors to detect gamma radiation indicative of a plurality of positron annihilation events;

rotating the detectors to a plurality of angular positions about the examination region; and repeating the steps of placing, moving, and utilizing at each of the angular positions; and generating an image indicative of the positron annihilation events.

33. A method of imaging comprising:

positioning first and second detectors about an examination region, each detector having a radiation sensitive face which faces the examination region, the second detector including a plurality of septa disposed between its radiation sensitive face and the examination region, each of the septa having a major axis which extends in a transverse direction, the septa having a first septal period a and a corresponding septal frequency 1/a;

utilizing the detectors to detect gamma radiation indicative of a plurality of positron annihilation events;

translating the septa in an axial direction by a distance equal to $$\frac{1}{2n} \times a,$$

where n is an integer, and utilizing the detectors to detect gamma radiation indicative of a plurality of positron annihilation events;

repeating the step of translating n-1 times such that radiation is detected with the septa located at n axial positions; and generating an image indicative of the positron annihilation events.

34. The method of claim 33 further including:

rotating the detectors to a plurality of angular positions about the examination region;

repeating the steps of utilizing, translating, and repeating the step of translating at each of the angular positions.

35. The method of claim 33 wherein n is equal to one of 1, 2, or 4.

36. The method of claim 33 further including rotating the detectors about the examination region to a plurality m of angular positions, the rotation of the detectors and the translation of the septa being coordinated such that, at each angular position, the septa are positioned at a plurality of discrete positions, each of the positions being separated by a distance equal to $$\frac{m}{2n} \times a.$$

37. A method of imaging comprising:

positioning first and second detectors about an examination region, each detector having a radiation sensitive face which faces the examination region, the second detector including a plurality of septa disposed between its radiation sensitive face and the examination region, each of the septa having a major axis which extends in a transverse direction, the septa having a first septal period;

moving the septa to a first plurality of discrete axial positions each offset by a distance d which is less than the septal period;

at each of the first plurality of discrete axial positions, utilizing the detectors to detect radiation indicative of positron annihilation events occurring within the examination region;

rotating the detectors about examination region to a second angular position;

moving the septa to a second plurality of discrete axial positions each offset by the distance d, the second plurality of discrete axial positions being offset from the first plurality of discrete axial positions by an amount which is less than the distance d;

at each of the second plurality of discrete axial positions, utilizing the detectors to detect radiation indicative of positron annihilation events occurring within the examination region; and generating an image indicative of the positron annihilation events.

* * * * *